(12) United States Patent
Miller

(10) Patent No.: US 7,699,373 B2
(45) Date of Patent: Apr. 20, 2010

(54) BED EXTENSION ASSEMBLY

(75) Inventor: Ryan Miller, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/023,930

(22) Filed: Jan. 31, 2008

(65) Prior Publication Data

US 2009/0195007 A1    Aug. 6, 2009

(51) Int. Cl.
*B62D 33/037*    (2006.01)

(52) U.S. Cl. .................... 296/26.09; 296/50

(58) Field of Classification Search ..... 296/26.08–26.1, 296/50, 61, 37.1, 37.5
See application file for complete search history.

(56) References Cited

U.S. PATENT DOCUMENTS

| | | | |
|---|---|---|---|
| 97,808 A * | 12/1869 | Powell et al. ............... | 296/50 |
| 2,806,735 A | 9/1957 | Smith | |
| 3,711,882 A * | 1/1973 | Iller ............................ | 14/69.5 |
| 4,950,123 A | 8/1990 | Brockhaus | |
| 5,338,136 A | 8/1994 | Hetchler | |
| 5,433,566 A | 7/1995 | Bradley | |
| 5,685,594 A | 11/1997 | Harper | |
| 5,752,800 A | 5/1998 | Brincks et al. | |
| D399,468 S | 10/1998 | Lund et al. | |
| 5,816,637 A | 10/1998 | Adams et al. | |
| 5,823,597 A | 10/1998 | Anderson | |
| 5,857,724 A | 1/1999 | Jarman | |
| 5,876,086 A | 3/1999 | Lagrou et al. | |
| 5,934,863 A | 8/1999 | Beck | |
| 6,019,410 A | 2/2000 | Trostle et al. | |
| 6,279,980 B1 | 8/2001 | Straschewski | |
| 6,312,034 B1 | 11/2001 | Coleman, II et al. | |
| 6,328,366 B1 | 12/2001 | Foster et al. | |
| 6,340,190 B1 | 1/2002 | Rosebrugh et al. | |
| 6,378,926 B1 | 4/2002 | Renze et al. | |
| 6,471,455 B2 | 10/2002 | Skiba | |
| 6,513,688 B2 | 2/2003 | Kmita et al. | |
| 6,536,822 B1 | 3/2003 | Vagedes et al. | |
| 6,682,114 B1 | 1/2004 | Cox | |
| 6,921,492 B2 | 7/2005 | De Gaillard | |
| 7,021,689 B1 | 4/2006 | Weisbeck, III | |
| 7,237,817 B2 | 7/2007 | Kobylski et al. | |
| 7,377,563 B1 * | 5/2008 | Demick ..................... | 293/116 |
| 7,381,019 B1 | 6/2008 | Boice | |
| 2002/0109367 A1 | 8/2002 | Terrusa | |
| 2003/0141733 A1 | 7/2003 | Burg | |
| 2005/0161964 A1 | 7/2005 | Adleman, Jr. | |
| 2006/0125267 A1 | 6/2006 | Stevenson et al. | |

(Continued)

OTHER PUBLICATIONS

U.S. Appl. No. 12/481,298, filed Jun. 9, 2009.

*Primary Examiner*—Dennis H Pedder
(74) *Attorney, Agent, or Firm*—Mark E. Duell; Rankin, Hill & Clark LLP

(57) ABSTRACT

A bed extension assembly for a vehicle includes a bed assembly having a bed floor, sidewalls disposed along sides of the bed floor and a split tailgate assembly disposed adjacent a rearward edge of the bed floor between the sidewalls. The split tailgate assembly includes a first door pivotally secured to one of the sidewalls and a second door pivotally secured to another of the sidewalls. A bed extender member is movably secured to the bed assembly for movement between a stowed position beneath the bed floor and in an extended position protruding rearwardly from the bed assembly.

17 Claims, 4 Drawing Sheets

U.S. PATENT DOCUMENTS

2006/0226673 A1* 10/2006 Miller ........................ 296/61
2007/0090661 A1* 4/2007 Shagbazyan ............. 296/26.09
2007/0210599 A1 9/2007 Arnold

* cited by examiner

BED EXTENSION ASSEMBLY

BACKGROUND

The present invention generally relates to a bed extension assembly for a vehicle, and more particularly to a bed extension assembly including a split-type tailgate openable in a center thereof disposed along a rearward side of a bed floor and a bed extender movable between a stowed position and an extended position for providing increased floor area.

Storage capacity in pick-up vehicles, particularly storage capacity in the beds of such vehicles, is a concern that has been addressed many times over. The need for sufficient storage space in the bed has become even more critical with the introduction of sport utility truck (SUT) vehicles, which often include an open-ended load carrying bed that is something less than full size.

One attempted solution for increasing the storage capacity of a pick-up truck's load carrying bed is to provide an accessory part that can be a cage-type structure that locks into place when the bed's tailgate is down to create an auxiliary storage area. The tailgate then becomes the floor of the auxiliary storage space and the accessory cage forms side and rear walls of the auxiliary storage space.

This solution is less than optimal because the bed can only be extended a dimension equal to that of the height of the tailgate. Moreover, the accessory part must then be hauled around as an extra part and, in cage form, the accessory part may not sufficiently contain smaller items capable of slipping between bars forming spaces within the caged accessory. Still further, in a conventional cage accessory mounted upon a tailgate, most if not all of the strength of the extended floor must be supported by the tailgate (i.e., the cage accessory provides no support).

SUMMARY

According to one aspect, a bed extension assembly for a vehicle is provided. More particularly, in accordance with this aspect, the bed extension assembly includes a bed assembly having a bed floor, sidewalls disposed along the sides of the bed floor, and a split tailgate assembly disposed adjacent a rearward edge of the bed floor between the sidewalls. The split tailgate assembly includes a first door pivotally secured to one of the sidewalls and a second door pivotally secured to another of the sidewalls. A bed extender member is movably secured to the bed assembly for movement between a stowed position beneath the bed floor and an extended position protruding rearwardly from the bed assembly.

According to another aspect, an external bed assembly for a vehicle is provided. More particularly, in accordance with this aspect, the external bed assembly includes a bed floor defining a bed floor area and sidewalls extending upward from the bed floor along longitudinal sides thereof. A split-type tailgate openable in a center thereof is disposed along a rearward side of the bed floor and laterally between the sidewalls. A bed extender is secured to the vehicle and is movable between a stowed position and an extended position. The bed extender and the bed floor together provide increased floor area relative to the bed floor area when the bed extender is in the extended position.

According to yet another aspect, a combination tailgate and bed assembly for a vehicle is provided. More particularly, in accordance with this aspect, the combination tailgate and bed assembly includes a split-type tailgate having a first door and a second door. Each of the first and second doors is pivotally mounted for swinging movement about a respective vertical axis. A load-carrying bed is defined by a bed floor. The split-type tailgate and sidewalls are disposed along longitudinal sides of the bed floor. The first door is pivotally mounted to a first of the sidewalls adjacent a rear portion thereof and the second door is pivotally mounted to a second of the sidewalls adjacent a rear portion thereof. The split-type tailgate defines a rear wall of the load-carrying bed when the first and second doors are in closed positions. A bed extender is provided for selectively increasing floor area of the load-carrying bed. The bed extender is movable to a stowed position wherein the bed extender is stored beneath the bed floor and to an extended position wherein the bed extender adds floor area to the bed floor.

DETAILED DESCRIPTION

Figure 1:
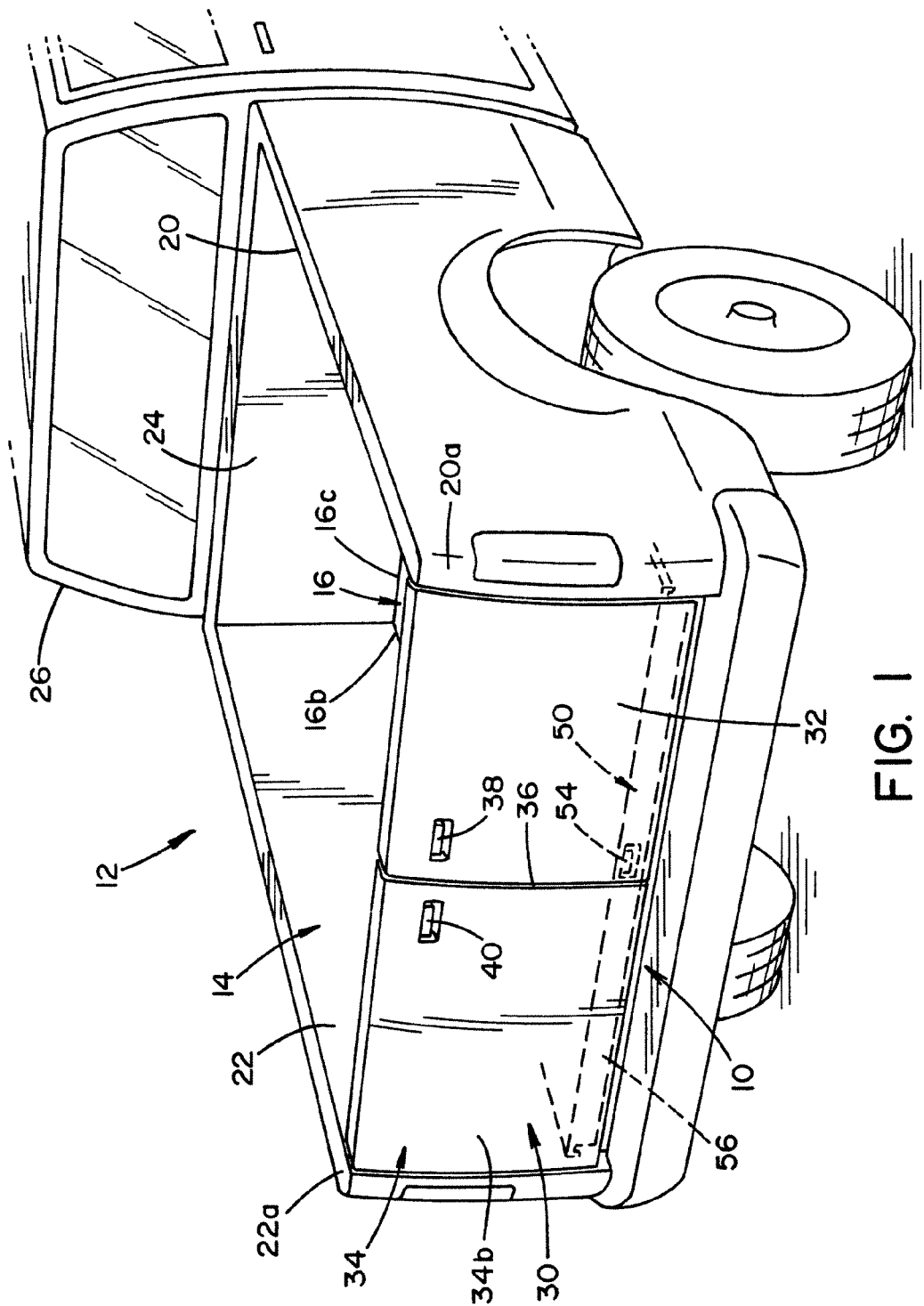
FIG. 1 is a perspective view of a bed extension assembly for a vehicle including a split-type tailgate openable in a center thereof and a bed extender movable between a stowed position and an extended position.

Referring now to the drawings wherein the showings are for purposes of illustrating one or more exemplary embodiments, FIG. 1 shows a bed extension assembly 10 for a vehicle 12. In the illustrated embodiment, the vehicle 12 is a sport utility truck (SUT), but it is to be appreciated by those skilled in the art that the vehicle 12 could be any other type of vehicle having a bed, such as a pick-up truck, sport utility, cross-over, utility truck or other vehicle. The bed extension assembly 10 includes a bed assembly or load-carrying bed of the vehicle 12. In the illustrated embodiment, the load-carrying bed is depicted as an external bed, but it is to be appreciated that a bed 14 could be a covered bed or disposed integrally with a passenger cabin of a vehicle.

Figure 2:
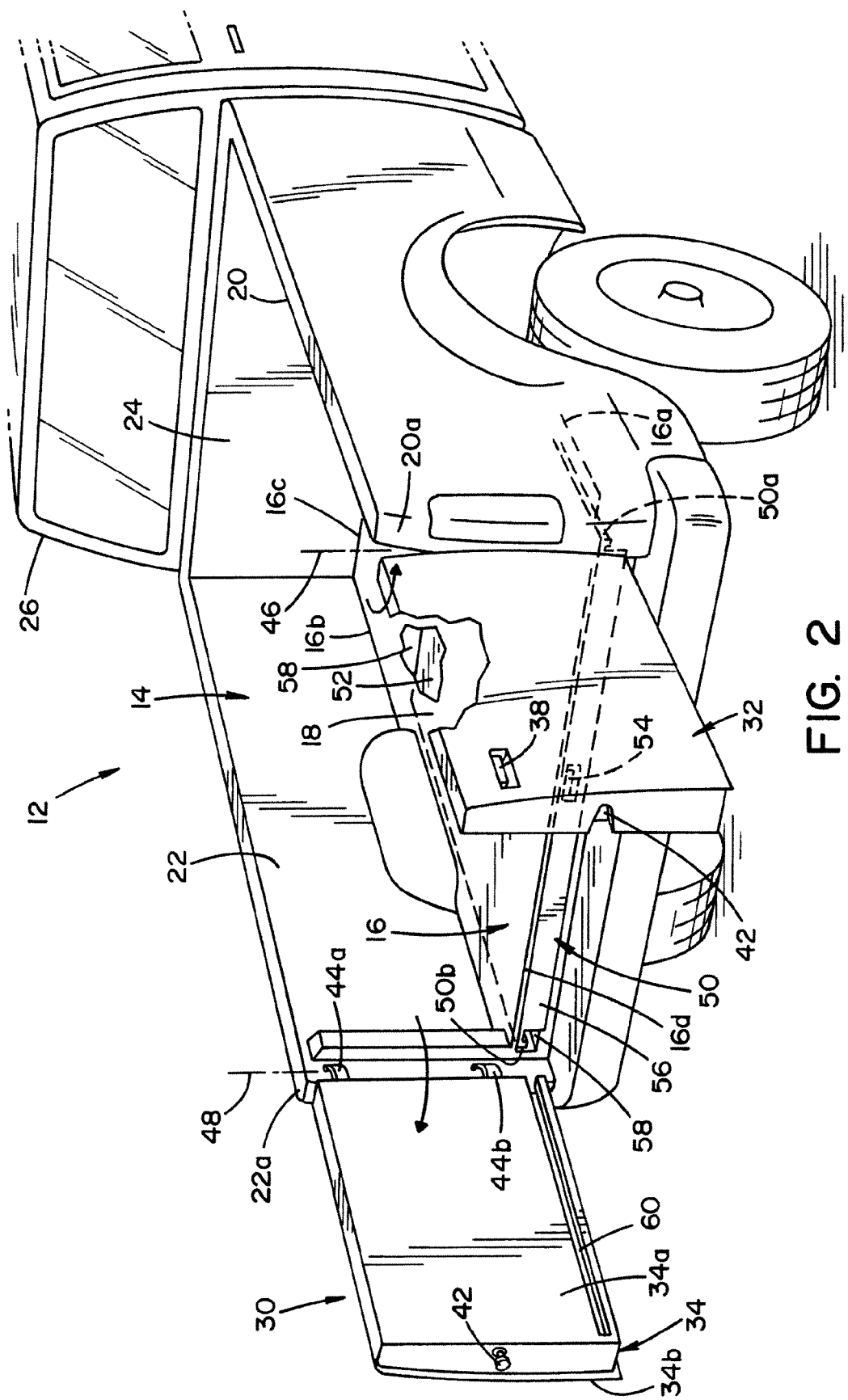
FIG. 2 is a perspective view of the bed extension assembly of FIG. 1 shown with doors of the split-type tailgate assembly in open, sidewall forming positions.
Figure 3:
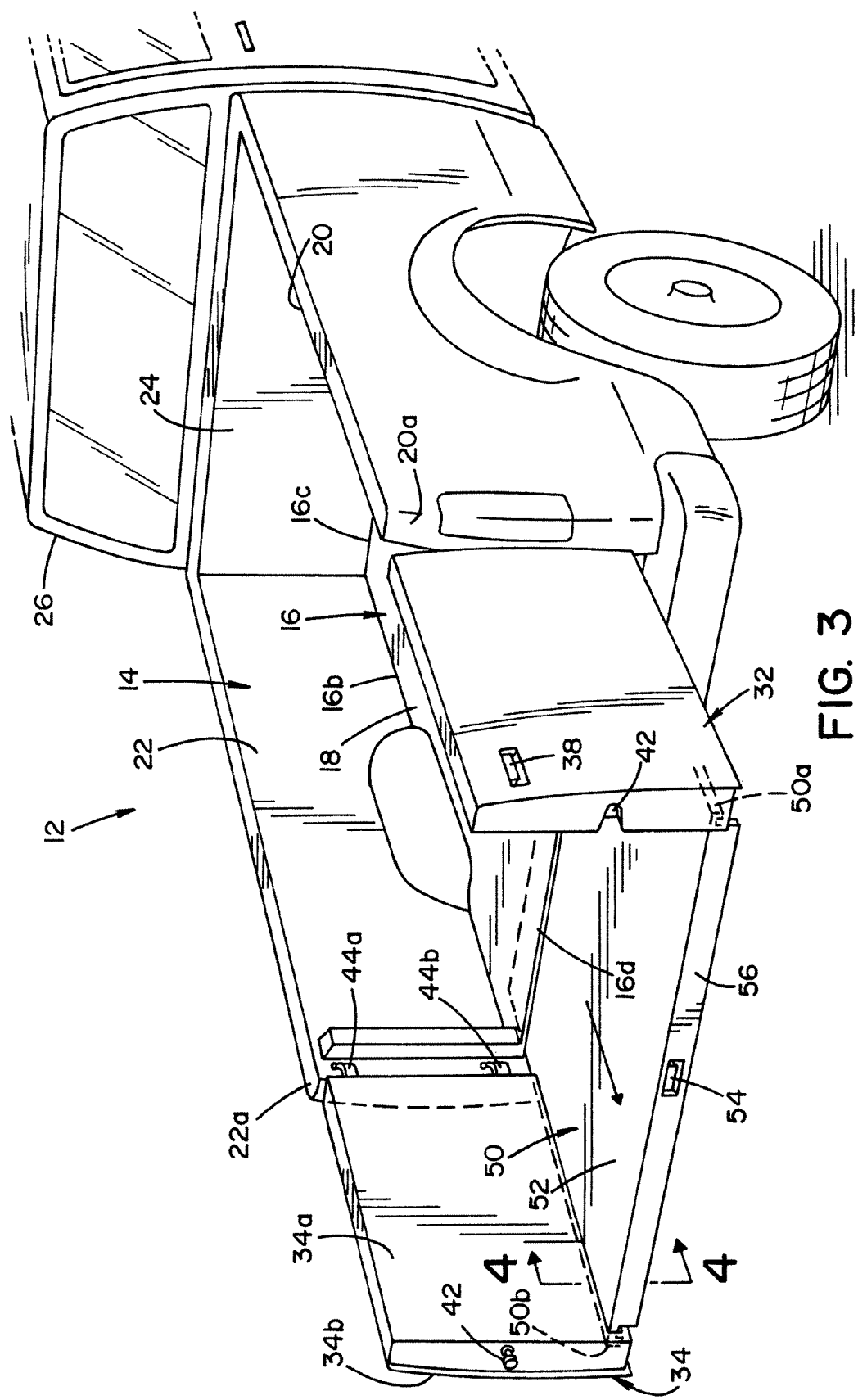
FIG. 3 is a perspective view of the bed extension assembly of FIG. 1 shown with the split-type tailgate doors in their open, sidewall forming positions and the bed extender member in its extended position.

With additional reference to FIGS. 2 and 3, the bed assembly 14 has a bed floor 16 that defines a bed floor area 18. The bed assembly 14 additionally includes sidewalls 20, 22 disposed along sides or edges 16a, 16b of the bed floor 16. More particularly, the sidewalls, which include first sidewall 20 (shown as the right sidewall in the figures) and the second sidewall 22 (shown as the left sidewall and the figures), extend upward from the bed floor 16 along the bed floor's longitudinal sides 16a, 16b. The bed assembly 14 further includes a forward wall 24 disposed adjacent a forward edge 16c of the bed floor 16 and a split tailgate assembly or split-type tailgate 30 disposed adjacent a rearward edge 16d of the bed floor 16 between the sidewalls 20, 22. When the vehicle 12 is an SUT or pick-up truck having an exterior bed, as depicted in the illustrated embodiment, a forward wall 24 can be disposed adjacent or as forming a rearward wall of a cab portion 26 of the vehicle.

The split-type tailgate 30 includes a first door 32 (right door in the figures) pivotally secured to one of the sidewalls (i.e., the first sidewall 20) and a second door 34 (the left door in the figures) pivotally secured or mounted to another of the sidewalls (i.e., second sidewall 22). More specifically, the first door 32 is pivotally mounted to the first sidewall 20 adjacent a rear portion 20a thereof and the second door 34 is pivotally mounted to the second sidewall 22 adjacent a rear portion 22a thereof. The first and second doors 32, 34 can be mounted conventionally, as is known and understood by those skilled in the art, such that the split-type tailgate 30 is openable in or along a center or parting line 36. For facilitating opening and closing of the doors 32, 34, handles 38, 40 can be provided, along with appropriate latching mechanisms 42 (e.g., latches, strikers, accommodating recesses, etc.).

As is also known and understand by those skilled in the art, the doors 32, 34 can be pivotally mounted to the sidewalls 22, 24 by appropriate mounting structures, such as hinges 44a, 44b shown mounting door 34 to sidewall 22. In particular, the first door 32 can be mounted to the sidewall 20 for movement about a first door vertical axis 46 and the second door 34 can be mounted to the second sidewall 22 for pivotal movement about second vertical axis 48 which is generally parallel and spaced apart relative to first vertical axis 46. As shown in FIG. 1, the split-type tailgate 30 defines a rearward wall of the load carrying bed 14 when the first and second doors 32, 34 are in closed positions and extends laterally between the sidewalls 20, 22. As is described in more detail below, the doors 32, 34 are particularly mounted for swinging movement about their respective vertical axis 46 or 48.

The bed extension assembly 10 further includes a bed extender member 50, also referred to herein as simply a bed extender, that is movably secured to the bed assembly 14 for movement between a stowed position (FIGS. 1 and 2) beneath the bed floor 16 and an extended position (FIG. 3) protruding rearwardly from the bed assembly 14. The bed extender 50 has an upper planar surface 52 that is generally parallel to the bed floor 16 when the bed extender is in both its stowed position and extended position. As best shown in FIG. 3, the bed extender 50 can be coplanar or nearly coplanar with the bed floor 14 when the bed extender is in the extended position. More particularly, in the illustrated embodiment, the bed extender 50 and thus the upper planer surface 52 are only slightly offset or positioned below the bed floor 16 so that a minimal step is formed between the bed floor and the bed extender. In alternative arrangements, it is contemplated that the bed extender 50 could move to its extended position and also be raised slightly so as to be completely coplanar with the bed floor. The bed extender 50, and particularly its upper surface 52, in combination with the bed floor 16 to together provide or form an increased floor area relative to the bed floor area when the bed extender 50 is in the extended position.

As shown in FIG. 2, the first and second doors 32, 34 are each openable to a respective sidewall forming position. More particularly, when in the first door sidewall forming position, a first door 32 is generally parallel with the sidewall 22. Of course, when closed, the first door 32 is approximately normal relative to the sidewall 22. Similarly, the second door 34 is generally parallel with the sidewall 22 when in the second door sidewall forming position and approximately normal relative to the sidewall 22 when in a second door closed position. Thus, the two pivotal doors 32, 34 are each openable from a closed position to a sidewall forming position. The doors 32,34 form a generally continuous wall laterally between ends 20a, 22a of the sidewalls when the doors are in their respective closed positions. In contrast, each of the doors 32, 34 is positioned to approximately ninety degrees (90°) relative to the closed position when in its respective sidewall forming position. As will be described in more detail below, the first and second doors 32, 34 are each lockable in their respective sidewall forming positions.

As best shown by contrasting FIGS. 1 and 2, access to the bed extender 50 is substantially prevented when the first and second doors 32, 34 are in their closed positions (shown in FIG. 1) which prevents movement of the bed extender from its stowed position to its extended position. When the doors 32, 34 are in open positions, such as their respective sidewall forming positions, access to the bed extender 50 is provided and the bed extender can be moved from its stowed position of FIG. 2 to its extended position of FIG. 3. For facilitating movement of the bed extender between its stowed and extended positions, an extender handle member 54 can be provided on a rear face 56 of the extender 50.

When the bed extender 50 is moved to its extended position for selectively increasing floor area of the load carrying bed 14 and the doors 32, 34 are in their sidewall forming positions, the doors are disposed along longitudinal sides 50a, 50b of the bed extender 50 and thus form bed extender sidewalls for the bed extender 50. More particularly, as shown in FIG. 3, each of the doors 32, 34 is disposed along a corresponding side 50a or 50b of the bed extender when the doors are in their respective sidewall forming positions and the bed extender 50 is in its extended position.

In the illustrated embodiment, the bed extender 50 is simply received within a cavity or recess 58 defined in the vehicle 12 beneath the bed floor 16. It is contemplated that a variety of arrangements could be provided for facilitating movement of the bed extender from its stowed position beneath the bed floor 16 to its extended position and vice versa. For example, rollers, sliding arrangements or other mechanisms could be provided for facilitating movement of the bed extender between the stowed and extended positions.

In the extended position and while moving toward the extended position, the bed extender 50 and the doors 32, 34 can interlock with one another to lock the doors in their side wall forming positions and provide a structure with improved rigidity and strength for carrying cargo. More particularly, the interlocking between the bed extender 50 and the doors 32, 34 allows loads received on the bed extender 50 to be distributed to hinges (e.g., hinges 44a and 44b) pivotally mounting the door 32, 34 to the side walls 20, 22 in addition to the cantilevered load bore by the bed extender attaching to the load carrying bed 14.

Figure 4:
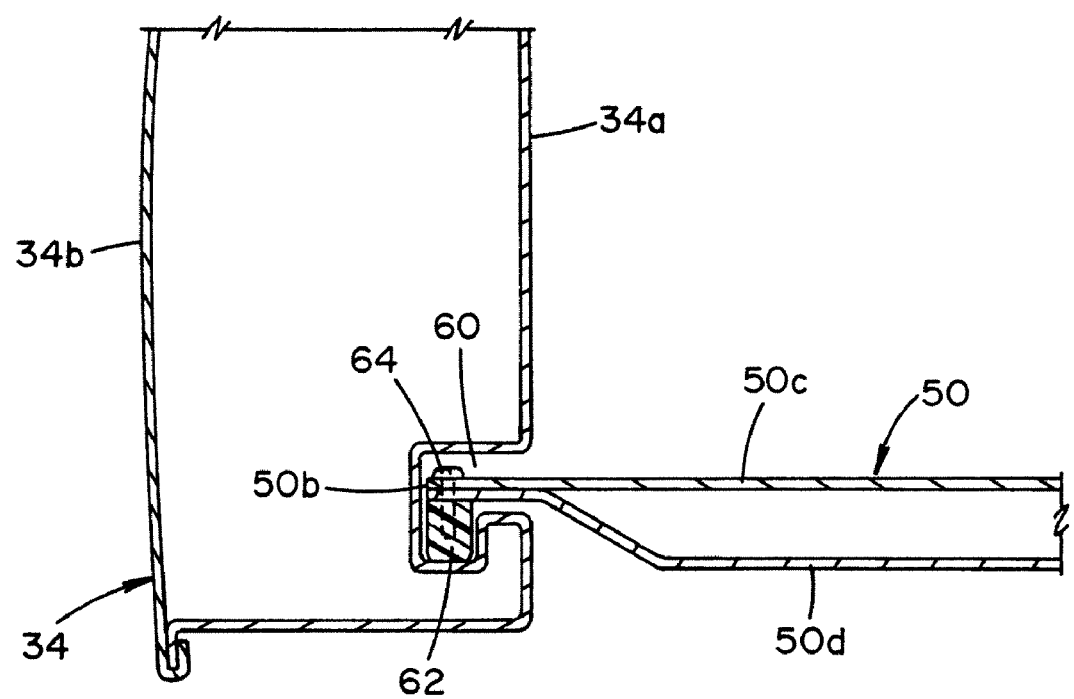
FIG. 4 is a partial cross-sectional view taken along the line 4-4 of FIG. 3 to show a sliding engagement between the bed extender and one of the split-type tailgate doors.

In the illustrated embodiment, one of the bed extender 50 and the first and second doors 32, 34 defines a set of longitudinal grooves and the other of the bed extender and the first and second doors includes respective portions received in the set of longitudinal grooves. This set of longitudinal grooves guides movement of the bed extender between the stowed position and the extended position and serves to interlock the bed extender 50 and the doors 32, 34. In particular, with reference to FIG. 4, the first and second doors 32, 34 define a set of longitudinal grooves 60 in the illustrated embodiment. FIG. 4 only illustrates the interlocking engagement between the bed extender 50 and the door 34 (thus only one of the grooves 60 is shown). However, it is to be appreciated by those skilled in the art that this same arrangement could be provided between the bed extender and the door 32. As illustrated, the door 34 can be formed of an inner panel member 34a and an outer panel member 34b. The inner panel member 34a can define a longitudinal groove 60 therein for receiving and interlocking with the extender member 50. The bed extender 50 can similarly be formed using conventional vehicle structural member forming techniques. More particularly, the bed extender 50 can be formed of an upper panel 50c and a lower panel member 50d. Side edges of the panel members 50c, 50d form the sides or edges 50a, 50b of the bed extender 50.

In FIG. 4, the bed extender side 50b is shown and includes a guiding portion 62 extending downwardly therefrom and connected to the extender member 50 by a suitable fastener such as a bolt 64. A similar arrangement can be provided along the bed extender side 50a so as to provide the bed extender 50 with guiding portions 62 disposed along its longitudinal sides 50a, 50b that are each lockingly received in a corresponding groove 60 for facilitating sliding movement therealong. Of course, other locking arrangements are contemplated and should be considered as within the scope of the present disclosure for locking the bed extender to one or both of the doors 32, 34. Moreover, it is also to be appreciated by those skilled in the art that the bed extender 50 can have appropriate structure or mechanisms associated therewith for locking the bed extender in its extended position.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A bed extension assembly for a vehicle, comprising:
   a bed assembly having a bed floor, sidewalls disposed along sides of said bed floor and a split tailgate assembly disposed adjacent a rearward edge of said bed floor between said sidewalls;
   said split tailgate assembly including a first door pivotally secured to one of said sidewalls and a second door pivotally secured to another of said sidewalls; and
   a bed extender member movably secured to said bed assembly for movement between a stowed position beneath said bed floor and an extended position protruding rearwardly from said bed assembly,
   one of said bed extender member and said first and second doors defines a set of longitudinal grooves and the other of said bed extender member and said first and second doors includes respective portions received in said set of longitudinal grooves, said set of longitudinal grooves guiding movement of said bed extender member between said stowed position and said extended position.

2. The bed extension assembly of claim 1 wherein said first door, which is pivotally secured to said one of said sidewalls by a first door hinge, is pivotable about a first vertical axis, and said second door, which is pivotally secured to said another of said sidewalls by a second door hinge, is pivotable about a second vertical axis, said second vertical axis being parallel to said first vertical axis.

3. The bed extension assembly of claim 1 wherein said bed extender member has an upper planar surface that is parallel to said bed floor when said bed extender member is in both said stowed position and said extended position.

4. The bed extension assembly of claim 1 wherein said bed extender member has an upper surface that is generally parallel to said bed floor, said upper surface and said bed floor together forming an increased floor area for said bed assembly when said bed extender member is in said extended position relative to a bed floor area of said bed floor when said bed extender member is in said stowed position.

5. The bed extension assembly of claim 1 wherein said first and second doors are each openable to a sidewall forming position wherein said first and second doors are disposed along sides of said bed extender member when in said extended position to form bed extender sidewalls for said bed extender member.

6. The bed extender assembly of claim 5 wherein said first door is generally parallel with said one of said sidewalls when in said sidewall forming position and approximately normal relative to said one of said sidewalls when in a first door closed position, and said second door is generally parallel with said another of said sidewalls when in said sidewall forming position and approximately normal relative to said another of said sidewalls when in a second door closed position.

7. The bed extender assembly of claim 5 wherein said first and second doors are each locked in said sidewall forming position by an engagement with said bed extender when said bed extender is moved to said extended position with said first and second doors each in said sidewall forming position.

8. The bed extender assembly of claim 1 wherein said first and second doors define said set of longitudinal grooves.

9. The bed extender assembly of claim 8 wherein said bed extender member includes guiding portions disposed along longitudinal sides thereof that are each lockingly received in a corresponding groove of said set of longitudinal grooves for sliding movement therealong.

10. An external bed assembly for a vehicle, comprising:
    a bed floor defining a bed floor area;
    sidewalls extending upward from said bed floor along longitudinal sides thereof;
    a split-type tailgate openable in a center thereof disposed along a rearward side of said bed floor and laterally between said sidewalls; and
    a bed extender secured to the vehicle and slidable between a stowed position and an extended position, wherein one of said bed extender and said tailgate includes a first interlocking structure and the other of said bed extender and said tailgate includes a second interlocking structure, and wherein sliding movement of said bed extender from said stowed position to said extended position causes said first and second interlocking structures to cooperatively interlock with one another and sliding movement of said bed extender from said extended position to said stowed position causes said first and second interlocking structures to disconnect and disunite from one another said bed extender and said bed floor together provide increased floor area relative to said bed floor area when said bed extender is in said extended position.

11. The external bed assembly of claim 10 wherein said bed extender member is positioned beneath said bed floor when in said stowed position.

12. The external bed assembly of claim 10 wherein said split-type tailgate is formed by two pivotal doors that swing open about respective vertical axes formed adjacent ends of said sidewalls.

13. The external bed assembly of claim 12 wherein said two pivotal doors are each openable from a closed position to a sidewall forming position, said two pivotal doors forming a generally continuous wall laterally between ends of said sidewalls when said doors are in said respective closed positions, each of said two pivotal doors positioned approximately ninety (90) degrees relative to said closed position when in said sidewall forming position, and each of said doors being disposed along a corresponding side of said bed extender when said doors are in said respective sidewall forming positions and said bed extender is in said extended position.

14. An external bed assembly for a vehicle, comprising:
    a bed floor defining a bed floor area;

sidewalls extending upward from said bed floor along longitudinal sides thereof;

a split-type tailgate openable in a center thereof disposed along a rearward side of said bed floor and laterally between said sidewalls; and a bed extender secured to the vehicle and slidably movable between a stowed position and an extended position, said bed extender and said bed floor together provide increased floor area relative to said bed floor area when said bed extender is in said extended position, wherein said first and second doors each define a longitudinal groove that receives a corresponding guiding portion of said bed extender which is defined along a longitudinal side of said bed extender for guiding movement of said bed extender between said stowed position and said extended position.

15. A combination tailgate and bed assembly for a vehicle, comprising:

a split-type tailgate having a first door and a second door, each of said first and second doors pivotally mounted for swinging movement about a respective vertical axis;

a load-carrying bed defined by a bed floor, said split-type tailgate and sidewalls disposed along longitudinal sides of said bed floor, said first door pivotally mounted to a first of said sidewalls adjacent a rear portion thereof and said second door pivotally mounted to a second of said sidewalls adjacent a rear portion thereof, said split-type tailgate defining a rearward wall of said load-carrying bed when said first and second doors are in closed positions; and a bed extender for selectively increasing floor area of said load-carrying bed, said bed extender slidable to a stowed position wherein said bed extender is stored beneath said bed floor and slidable to an extended position wherein said bed extender adds floor area to said bed floor, at least one of said bed extender and said first and second doors including an interlocking structure that interlocks said bed extender and said first and second doors as said bed extender is slid to said extended position from said stowed position with said first and second doors in open positions thereby distributing loads received in said bed extender through said first and second doors to hinges mounting said first and second doors, sliding action of said bed extender causing interlocking between said bed extender and said first and second doors.

16. The combination tailgate and bed assembly of claim 15 wherein said first and second doors are each openable from respective closed positions to respective sidewall forming positions, each of said first and second doors positioned forming bed extender sidewalls when in said sidewall forming positions and said bed extender is in said extended position.

17. The combination tailgate and bed assembly of claim 16 wherein access to said bed extender is substantially prevented when said first and second doors are in said closed positions thereby preventing movement of said bed extender from said stowed position to said extended position when said first and second doors are in said closed positions.

* * * * *